United States Patent Office 3,342,892
Patented Sept. 19, 1967

3,342,892
PREPARATION OF LINEAR POLYARYL ETHERS
Thomas M. Laakso and James J. Saturno, Rochester, N.Y., assignors to Eastman Kodak Company, Rochester, N.Y., a corporation of New Jersey
No Drawing. Filed Aug. 7, 1964, Ser. No. 388,260
12 Claims. (Cl. 260—823)

This invention relates to the preparation of soluble film and fiber-forming, crystalline linear polyaryl ethers, and more particularly to soluble film and fiber-forming, crystalline 2,6-dialkyl substituted-1,4-phenylene oxide linear polymers that are especially useful as photographic film supports, from certain halogenated phenols employing an improved catalyst combination.

It has previously been proposed to prepare phenylene oxide type of polymers from various halogenated aromatic compounds. For example, dihydroxypolyphenyl ethers were prepared by reacting a dihalo aromatic compound, e.g. p-dibromobenzene, with an alkoxyphenol, e.g. p-methoxyphenol, in the presence of a strong base, e.g. potassium hydroxide, and copper powder. The terminal methoxy groups were then demethylated by known methods to yield the corresponding dihydroxy ethers. This process has a number of serious drawbacks. For example, it requires two separate reactions and furthermore gives polymers of entirely too low molecular weight to be useful as film support materials. Another method that has been proposed for polymerizing phenols to polymers, having in the case of phenol the empirical formula $C_6H_4O$, involves passing an electric current through a molten phenol whereby the polymer is formed and deposited at the anode in the form of a film or coating. Metallic materials serving as anodes can be coated by this means. However, these polymeric coatings, even if it were possible to strip them from the metals as continuous films, are insoluble, cross-linked, heat-resistant and relatively highly colored thereby raising practically insurmountable difficulties in any attempt to work and use them as materials for photographic film supports. Thus, the prior art processes as illustrated above have not proved satisfactory for producing phenylene oxide type of polymers having the required film support characteristics.

We have now found that by using an aliphatic tertiary amine in conjunction with an oxidizing catalyst, preferably an alkali metal ferricyanide alone or together with an auxiliary oxidizing agent such as for example lead dioxide, that 4-halo-2,6-dialkylphenols can be made to polymerize interfacially to yield essentially clear and colorless, film and fiber-forming, crystalline, linear polymers having inherent viscosities ranging from about 0.6 to 1.2, or even higher (e.g. 2.0) in some cases, corresponding to molecular weights of about from 15,000 to 50,000 (as high as 100,000 or more in some cases) and having melting points for the higher molecular weight members above 260° C. All of the polymers have good solubility in conventional solvents and the films and fibers as cast or spun from such solutions or dopes show moderate crystallinity, high heat distortion temperatures and very low swell-shrink amplitudes, as well as other desirable fiber or film support characteristics. Orienting the cast films or sheets or drawing the fibers significantly improves their physical properties. We have found further that soluble film-forming, crystalline or crystallizable linear block copolymers of our polyaryl ethers with certain polycarbonates can also be prepared by use of the above mentioned catalyst combinations. Physical mixtures of our polyaryl ethers with polycarbonates also come within the invention. These too on orientation show improved physical properties.

It is, accordingly, an object of the invention to provide a novel process for the preparation of soluble, film and fiber-forming, crystalline, linear polyaryl ethers and more particularly soluble film and fiber-forming, crystalline 2,6-dialkyl-1,4-phenylene oxide linear polymers. Another object is to provide a process for preparing block copolymers comprising the above polymers. Another object is to provide an improved catalyst system comprising an aliphatic tertiary amine and an alkali metal ferricyanide for preparing these polymers. Another object is to provide physical mixtures of the above polymers with various polycarbonates that are compatible therewith. Another object is to provide fibers and films of improved physical and chemical characteristics from these polymers. Other objects will become apparent hereinafter.

In accordance with the invention, we prepare our soluble film-forming, crystalline, linear polymers by treating (i.e. contacting) interfacially at from about 0–15° C. and preferably 5–10° C., a 4-halogenated-2,6-dialkylphenol of the general structure:

I.

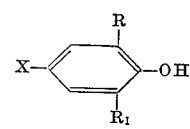

wherein each R and $R_1$ represents the same or different straight chain alkyl groups of 1–3 carbon atoms, e.g. methyl, ethyl or propyl groups and X represents a halogen atom preferably bromine or chlorine, in the presence of a catalyst combination comprising about 0.01–0.10 mole percent of an aliphatic tertiary amine and preferably a trialkylamine and about 0.1–1.0 mole percent of an alkali metal ferricyanide and preferably sodium or potassium ferricyanide, based in each case on the moles of above structure I compound used, until a polymer of the required molecular weight has been obtained. If desired, as previously mentioned, an auxiliary oxidizing agent such as lead dioxide can be employed with the alkali metal ferricyanide in about equal amount. The reaction is carried out in an alkaline liquid medium comprising water, a strong inorganic base such as an alkali metal hydroxide, e.g. sodium or potassium hydroxide, and an essentially water-insoluble organic solvent which is a solvent for the polymer such as, for example, benzene, toluene, xylene, etc., halogenated hydrocarbons such as dichloromethane, ethylene dichloride, propylene dichloride, chloroform, and the like. The concentration of the strong base can range from about 1–5 moles per mole of the halogenated phenol, and preferably from about 1.5–4 moles. The water and organic solvent can be in any operable proportions, but preferably in about a 1:1 mixture and in an amount to give an operable reaction medium. On completion of the reaction, the organic solvent layer containing the polymer product is separated and washed. The polymer is then recovered by pouring the solvent layer into a nonsolvent for the polymer such as, for example, methyl alcohol, filtering the polymer, washing and drying. However, for better purity, the precipitated polymer is usually redissolved in a minimum of solvent, the resulting solution filtered and the polymer reprecipitated in alcohol as before and then dried. Analytical data indicate that the final products prepared according to the above described procedure consist essentially of recurring units of the structure:

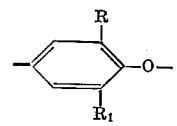

wherein each R and $R_1$ is as previously defined.

Suitable phenols of structure I include 4-bromo-2,6-dimethylphenol, 4-bromo-2,6-diethylphenol, 4-bromo-2,6-di-n-propylphenol, 4-bromo-2-methyl-6-ethylphenol, 4- bromo-2-methyl-6-n-propylphenol, and 4-bromo-2-ethyl-6-n-propylphenol, and the corresponding 4-chloro-2,6-dialkylphenols. That the above mentioned starting phenols are critical in the process of the invention is demonstrated by the fact that when the substituents tend to get large and bulky, as in the case of 4-bromo-2,6-di-t-butylphenol, the principal products are monomeric diphenoquinones. It is further demonstrated that when either the 2- or 6- positions is occupied by a halogen atom, as in the case of 4-bromo-2-chloro-6-methylphenol, the monomer reacts as a trifunctional monomer by elimination of chlorine from the 2-position.

Suitable trialkylamines for carrying the process of the invention include those represented by the general structure:

wherein each $R_2$, $R_3$ and $R_4$ represents the same or different branched or straight chain alkyl group of 1–6 carbon atoms, for example, trimethylamine, triethylamine, tri-isopropylamine, tri-n-propylamine, tri-n-butylamine, tri-t-butylamine, tri-n-hexylamine, mixed trialkylamines such as diethylmethylamine, di-n-propylmethylamine, dimethyl-n-propylamine, dimethylisopropylamine, dimethyl-sec-butylamine, di-n-butylisopropylamine, and the like.

For preparing the block copolymers of the invention, the method consists of (1) separately preparing relatively low molecular weight prepolymers, for example, a phenylene oxide linear polymer from a penol of above structure I and a polycarbonate from a bisphenol, with or without catalyst, in an organic solvent using an aqueous alkaline medium, (2) combining the separate reaction mixtures, (3) adding the catalyst combination of the invention thereto and (4) continuing the reaction interfacially until the block copolymer has attained the desired molecular weight. The products obtained are not necessarily crystalline as prepared, depending on the amount of the polyphenylene oxide component present. They can be crystalized, however, by treatment with certain organic solvents or mixtures of certain solvents, for example, a mixture of ethylene dichloride and acetone. The polycarbonate from bisphenol A is completely amorphous under these conditions. For photographic film support purposes, block copolymers containing not less than 50 mole percent of the polyphenylene oxide component of the invention and the remainder not more than 50 mole percent (to make 100 mole percent of copolymer) of the polycarbonate component are preferred.

The physical mixtures coming within the invention can vary quite widely from about 10–90 percent by weight of the 2,6-dialkyl-1,4-phenylene oxide linear polymers of the invention and from 90–10 percent by weight of the polycarbonate, for example, from bisphenol A, and still yield on orientation of cast films satisfactory photographic film supports. These mixtures can be prepared by any conventional means known in the art for preparing intimate physical mixtures, for example, by mixing solutions of the separate polymers, by heating on mixing rolls, etc.

The invention is further illustrated by the following examples.

EXAMPLE 1

One hundred grams (0.5 mole) of 4-bromo-2,6-dimethylphenol, 2.3 liters of benzene, 2.3 liters of water, 80 g. of sodium hydroxide and 1 mole percent of a mixture of lead dioxide and potassium ferricyanide and 3 drops (corresponding to about 0.04 mole percent) of tri-n-butylamine were stirred at 5°–8° C. for approximately 168 hours in an open vessel adding benzene to maintain the original volume. The washed benzene layer was then poured into 5 volumes of methyl alcohol precipitating the white fibrous poly(2,6-dimethyl-1,4-phenylene oxide). Yield was 65 g. The polymer was redissolved in a minimum amount of benzene, the solution filtered, and the polymer reprecipitated as before. The polymer was air-dried at 45° C. The yield was 46.5 g. or 80 percent of the theoretical amount.

Analysis.—C, 78.8; H, 6.3; Br, small amount. The inherent viscosity was 1.07 as measured at 25° C. in benzene using 0.25 g. of the polymer per 100 cc. of solution. This corresponds to a molecular weight of about 40,000–50,000. These results indicate that a polymer was obtained which was essentially poly(2,6-dimethyl-1,4-phenylene oxide). The physical properties of unoriented films of this polymer cast from a halogenated hydrocarbon solvent in a thickness of from 0.0004 to 0.0005 inch were as follows:

TABLE 1

| | |
|---|---|
| Young's modulus _____kg./cm.$^2$__ | 2.4×10$^4$ |
| Yield _____kg./cm.$^2$__ | 507 |
| Tensile _____kg./cm.$^2$__ | 499 |
| Elongation _____percent__ | 3 |
| Folds _____ | 2779 |
| Tear _____ | 57 |
| Heat distortion temp. _____° C__ | 248 |
| Humidity amplitude _____ | 0.2 |

This polymer also showed medium crystallinity in X-ray examination. The above values together with the comparative data shown in Example 5 indicate that the polymer of this example is an excellent photographic film support material.

EXAMPLE 2

This example illustrates that an alkali metal ferricyanide alone as the catalytic material, i.e. in the absence of the trialkylamine component, will not give a polymer of sufficiently high molecular weight for use as a film support.

Ninety-five grams (0.47 mole) of 4-bromo-2,6-dimethylphenol was polymerized under the same conditions as in Example 1, but only potassium ferricyanide was used as the catalyst. The yield was 81 percent. The polymer had an inherent viscosity in benzene at 25° C. of only 0.37. This corresponds to a molecular weight of substantially <10,000.

EXAMPLE 3

One hundred grams (0.63 mole) of 4-chloro-2,6-dimethylphenol was polymerized under exactly the same conditions as in Example 1. The yield was 80 percent. The polymer was moderately crystalline and had an inherent viscosity in benzene at 25° C. of 0.62, corresponding to a molecular weight of about 15,000. Films cast from a chloroform solution of this polymer showed good physical properties. By prolonging the reaction period, polymers having molecular weights on the order of 40,000–50,000 can also be prepared.

EXAMPLE 4

This example illustrates the preparation of a 1:1 block copolymer from a relatively low molecular weight poly (2,6-dialkyl-1,4-phenylene oxide) of the invention and a relatively low molecular weight polycarbonate derived from a bisphenol, and employing the catalytic process of the invention.

Solution A

A prepolymer of poly(2,6-dimethyl-1,4-phenylene oxide) was prepared from 20.1 g. (0.1 mole) of 4-bromo-2,6-dimethylphenol, 460 ml. water, 460 ml. methylene chloride, 20 g. sodium hydroxide and 0.25 g. of potassium ferricyanide as in Example 1. The methylene chloride layer was carefully separated.

Solution B

A solution of 22.8 g. (0.1 mole) bisphenol A [2,2-bis (4-hydroxyphenyl)propane] in 300 ml. water containing 11.4 g. sodium hydroxide and 200 ml. methylene chloride was treated with 10.9 g. phosgene in 50 ml. of dry methylene chloride at 10° C. with good stirring over a period of 15 minutes. The polycarbonate product had an intrinsic viscosity of 1.1 as measured in 50:50 phenol-chlorobenzene solution containing 0.25 g. of the polymer per 100 cc. of solution.

Solutions A and B were then mixed together and to this mixture there was added 3–4 drops of tri-n-butylamine and 0.25 g. of potassium ferricyanide, and stirring was continued for 30 minutes. The reaction mixture was acidified with glacial acetic acid and the whole poured into 3 to 4 volumes of methyl alcohol. The white fibrous polymer was washed and redissolved in chloroform. The chloroform solution was washed free of salts and reprecipitated by pouring into a large volume of methyl alcohol. The polymer was dried at 45° C. It had an inherent viscosity in chloroform at 25° C. of 0.41.

On X-ray examination the copolymer appeared amorphous, but after treatment in a mixture of ethylene chloride and acetone examination showed some crystallinity. The oriented polymer was well adapted for photographic film support purposes.

EXAMPLE 5

This example illustrates the preparation and physical properties of films prepared from the 2,6-dialkyl-1,4-phenylene oxide polymers of the invention.

The physical properties of the films as photographic film supports were determined by general standard procedures well known in the art. The films were cast from chloroform solution (15 percent solids) and cured. All films were approximately 0.004 to 0.005 inch thick. All polymers had inherent viscosities high enough to give satisfactory readings in the case of each individual property measured. The films were oriented by hand drawing the softened sheet when warmed on a carefully heated metal block. The block temperature and percent extension of the films were noted in each case. The data are reported in some detail in following Tables 2 and 3.

Referring to the above Table 2, it will be noted that the film prepared from poly(2,6-dimethyl-1,4-phenylene oxide) per se was of medium crystallinity, of low swell-shrink amplitude (0.2%), high heat distortion (248° C.) and very high folds (2779) as compared with the film prepared from bisphenol A polycarbonate per se which was amorphous, which was of relatively higher swell-shrink amplitude (0.6–0.8%), which had lower heat distortion temperature (145° C.) and which showed folds of only 880. The physically mixed samples containing 75% and 90%, respectively, of the bisphenol A polycarbonate showed intermediate values for these properties except for the fold value of 573 for the 90% sample which was substantially below that of bisphenol A polycarbonate per se. Thus, it is indicated by the mixed samples that while linear poly(2,6-dimethyl-1,4-phenylene oxide) of the invention by itself gives films of excellent physical properties, incorporation thereof in amounts up to 25% in bisphenol A polycarbonates does not significantly improve bisphenol A polycarbonates for film purposes.

By reference to Table 3 below, it will be seen that the oriented films, containing linear poly(2,6-dimethyl-1,4-phenylene oxide), prepared by hand drawing the softened cast sheets, when warmed on a metal block, resulted in improving the physical properties to a marked degree as compared with the corresponding unoriented films. The Young's modulus value was doubled as were the yield, tensile and elongation values. This same significant improvement in physical properties was also observed with the cast and oriented polyphenylene oxide film plasticized with Aroclor-1254 (a chlorinated hydrocarbon plasticizer for resins). The film cast from a physical mixture of bisphenol A polycarbonate and linear poly(2,6-dimethyl-1,4-phenylene oxide) also showed definite improvement in its physical properties when oriented. Any of the above-mentioned oriented films would be a satisfactory photographic film support.

From the foregoing, it will be evident that the crystalline 2,6-dialkyl-1,4-phenylene oxide linear polymers of the invention are especially suitable for the preparation

TABLE 2.—TENSILE AND FILM PROPERTIES OF CAST, UNORIENTED FILMS

| Polymer | Young's Modulus, kg./cm.$^2$ | Yield, kg./cm.$^2$ | Tensile, kg./cm.$^2$ | Elongation, Percent | Folds | Tear | Heat Distortion Temp., °C. | Humidity Amplitude, Percent | Degree of Crystallinity |
|---|---|---|---|---|---|---|---|---|---|
| Poly(2,6-dimethyl-1,4-phenylene oxide) [a] | 2.4×10$^4$ | 507 | 499 | 3 | 2,779 | 57 | 248 | 0.2 | Medium. |
| Poly(2,6-dimethyl-1,4-phenylene oxide) Plus 75% BPA Polycarbonate | 2.3×10$^4$ | (b) | 611 | 4 | 1,217 | 129 | 160 | 0.2 | High. Medium. |
| Poly(2,6-dimethyl-1,4-phenylene oxide) Plus 90% BPA Polycarbonate | 2.2×10$^4$ | 627 | 557 | 11 | 573 | 150 | 148 |  | Low. Medium. |
| BPA Polycarbonate | 2.1×10$^4$ | 582 | 558 | 5 | 880 | 83 | 145 | 0.6–0.8 | Amorphous. |

[a] Glass transition temperature=244°.
[b] Approx. 600±. Curve not well defined.
Films were 0.004 to 0.005 inch thick.
Poly(2,6-dimethyl-1,4-phenylene oxide), intrinsic visc.=1.07 in benzene at 25° C.
Bisphenol A polycarbonate, intrinsic visc.=1.1 in 50-50 phenol-chlorobenzene at 25° C.
The term "BPA" stands for Bisphenol A [2,2-bis(4-hydroxyphenyl)-propane]

TABLE 3.—TENSILE AND FILM PROPERTIES OF CAST UNORIENTED, ORIENTED, AND PLASTICIZED FILMS

| Sample | Y.M.×10$^{-4}$ | Yield, kg./cm.$^2$ | Tensile, kg./cm.$^2$ | Elong., Percent | HDT, °C. at +2% Elong. |
|---|---|---|---|---|---|
| 100% PPO unoriented | 2.4±0.10 | 514, 500 | 499±10 | 3 | 248. |
| Oriented 100% PPO, 150% ext. at 181° C | 4.9±0.14 | 1,180±100 | 1,381±105 | 10±2 |  |
| 100% PPO, 2d run unoriented | 2.9±0.74 | 496±55 | 537±63 | 4±0.6 |  |
| 100% PPO oriented 450%–500% ext. at 227° C | 5.9±0.58 | 1,132±88 | 1,765±103 | 8.6±0.2 | {−2%, 183° C. (100 p.s.i.). +2%, 242° C. |
| With 25% Arcolor-1254 unoriented | 2.7±0.21 |  | 700±17 | 2.7±0.2 | +2%, 109° C. |
| With 25% Arcolor 100–150% ext. at 105° C | 4.3±0.25 | 675±31 | 754±23 | 7±2.8 | {−2%, 95° C. +2%, 228° C. |
| Plus 90% BPA polycarbonate unoriented | 2.2±0.03 | 605, 649 | 557±20 | 8, 21, 4 | +2%, 148° C. |
| Plus 90% BPA polycarbonate 100% ext. 140° C | 41.±0.33 | 982±48 | 1,170±143 | 24.7±8 | {−2%, 141° C. +2%, 210° C. |

Films were 0.004 to 0.005 inch thick.
The term "PPO" stands for Poly(2,6-dimethyl-1,4-phenylene oxide) intrinsic visc.=1.07 in benzene at 25° C.
The term "BPA polycarbonate" stands for Bisphenol A polycarbonate, intrinsic visc.=1.1 in 50-50 phenol-chlorobenzene.
The term "ext." stands for extended or drawn.
The term "HDT" stands for Heat Distortion Temperature.
"Arclor-1254" is a trade name for a chlorinated hydrocarbon plasticizer for resins.
The term "Y.M." stands for Young's Modulus (kg./cm.$^2$).

of photographic film supports having unexpectedly greatly improved physical properties. As indicated previously, the polymers are readily soluble in commercially available solvents to give solutions or dopes that are characterized by being haze-free, homogeneous and smooth flowing. Such dopes can be cast into films which are not only haze-free, brilliant and optically clear in appearance, but which also exhibit the valuable physical properties of unusually high heat distortion temperatures, good toughness properties, adequate tensile strengths, and great flexibility as shown by the very high folds values, together with other advantageous properties such as low moisture susceptibility and good resistance to the action of acids and alkalies. These properties, and more especially the high heat distortion temperature and folds values (248° C. and 2779, respectively, see Table 2) are especially desirable for long life in cine films which in the usual projection practice are subjected to considerable heat as well as mechanical abrasion and wear. The oriented films (Table 3) show an unexpected increase in Young's modulus, in yield, in tensile strength and elongation over the values of the unoriented film. Since the films may be fabricated commercially in conventional equipment, this is an added advantage of economic importance. Furthermore, if desired, modifying materials such as fillers, dyes, stabilizers, plasticizers, pigments, and the like, may be incorporated into the coating solutions or dopes depending on the particular uses and requirements of the end products. For example, as previously mentioned, the solutions or dopes of the polymers, with or without additives, can be spun into fibers and these also can be oriented to give fibers of greatly improved physical properties. Other valuable products can also be produced such as molded shapes, cast objects and the like.

This invention has been described in detail with particular reference to preferred embodiments thereof, but it will be understood that variations and modifications can be effected within the spirit and scope of the invention as described hereinabove and as defined in the appended claims.

What we claim is:

1. A process for preparing a soluble film- and fiber-forming, crystalline 2,6-dialkyl-1,4-phenylene oxide linear polymer having a molecular weight of about 15,000–100,000 and consisting essentially of the recurring structural unit:

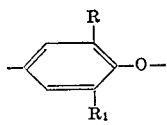

wherein each of R and R₁ represents a straight chain alkyl group of 1–3 carbon atoms, which comprises treating interfacially, a halogenated phenol of the structure:

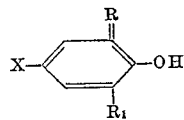

wherein R₁ and R are as above defined and X represents a halogen atom, with a catalyst comprising a mixture of a trialkylamine of the formula

wherein each of R₂ R₃ and R₄ represents an alkyl group of 1–6 carbon atoms and an alkali metal ferricyanide, at about 0–15° C., in a liquid medium comprising water, a strong inorganic base in amount sufficient to maintain the reaction medium in alkaline condition and an essentially water-insoluble organic solvent for the said polymer.

2. The process according to claim 1 wherein the said halogenated phenol is a 4-bromo-2,6-dialkylphenol.

3. The process according to claim 1 wherein the said halogenated phenol is a 4-chloro-2,6-dialkylphenol.

4. The process according to claim 1 wherein the said reaction is carried out in a continuous manner.

5. The process according to claim 1 wherein the said trialkylamine is present in amount of 0.01–0.10 mole percent and wherein the said alkali metal ferricyanide is present in amount of 0.1–1.0 mole percent, based on the moles of said halogenated phenol.

6. The process according to claim 1 wherein is included lead dioxide in the amount of 0.1–1.0 mole percent based on the moles of said halogenated phenol.

7. The process according to claim 2 wherein the said 4-bromo-2,6-dialkylphenol is 4-bromo-2,6-dimethylphenol.

8. The process according to claim 2 wherein the said strong inorganic base is an alkali metal hydroxide.

9. A process for preparing a soluble film- and fiber-forming, crystalline, linear poly(2,6-dimethyl-1,4-phenylene oxide) having a molecular weight of about 40,000–50,000 and consisting essentially of the recurring structural unit:

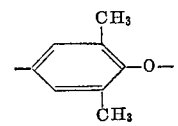

which comprises treating interfacially 4-bromo-2,6-dimethylphenol with a catalyst comprising 0.01–0.1 mole percent of tri-n-butylamine, 0.10–1.0 mole percent of potassium ferricyanide and 0.10–1.0 mole percent of lead dioxide, at 5–10° C., in a liquid medium comprising water, 1–5 mole of potassium hydroxide per mole of said 4-bromo-2,6-dimethylphenol, and benzene, until the said crystalline poly(2,6-dimethyl-1,4-phenylene oxide) has formed.

10. A process for preparing a soluble film- and fiber-forming, crystalline, linear poly(2,6-dimethyl-1,4-phenylene oxide) having a molecular weight of about 40,000–50,000 and consisting essentially of the recurring structural unit:

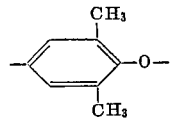

which comprises treating interfacially 4-chloro-2,6-dimethylphenol with a catalyst comprising 0.01–0.1 mole percent of tri-n-butylamine, 0.10–1.0 mole percent of potassium ferricyanide and 0.10–1.0 mole percent of lead dioxide, at 5–10° C., in a liquid medium comprising water, 1–5 mole of potassium hydroxide per mole of said 4-chloro-2,6-dimethylphenol, and benzene, until the said crystalline poly(2,6-dimethyl-1,4-phenylene oxide) has formed.

11. A process for preparing a block copolymer which comprises treating interfacially a mixture of not less than 50 mole percent of 2,6-dialkyl-1,4-phenylene oxide linear polymer consisting essentially of the recurring structural unit:

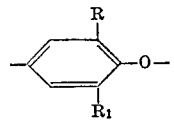

wherein each of R and R₁ represents a straight chain alkyl group of from 1–3 carbon atoms, and (2) about 50 mole percent of bisphenol A polycarbonate, with a catalyst comprising a mixture of a trialkylamine of the formula

wherein each of R₂, R₃ and R₄ represents an alkyl group of 1–6 carbon atoms and an alkali metal ferricyanide, at 0–15° C., in a liquid medium comprising water, a strong inorganic base in an amount sufficient to maintain the reaction medium in alkaline condition and an essentially water-insoluble organic solvent for the said polymer.

12. The process according to claim 11 wherein the said 2,6-dialkyl-1,4-phenylene oxide polymer is linear poly(2,6-dimethyl-1,4-phenylene oxide), wherein the said catalyst is a mixture of tri-n-butylamine and potassium ferricyanide, wherein the said base is potassium hydroxide, wherein the said solvent is methylene chloride, and wherein the said poly(2,6-dimethyl-1,4-phenylene oxide) and the said bisphenol A polycarbonate are present in equimolar quantities.

References Cited

UNITED STATES PATENTS

| | | | |
|---|---|---|---|
| 3,134,753 | 5/1964 | Kuratek | 260—47 |
| 3,221,080 | 11/1965 | Fox | 260—860 |

OTHER REFERENCES

Staffin et al., vol. 82, Journal of the American Chemical Society, pp. 3632–34.

MURRAY TILLMAN, *Primary Examiner.*

D. J. BREZNER, *Assistant Examiner.*